(12) United States Patent
Fan et al.

(10) Patent No.: US 12,309,587 B2
(45) Date of Patent: May 20, 2025

(54) ACCESS METHOD FOR NETWORK SERVICE AND RELATED MOBILE TERMINAL APPARATUS

(71) Applicant: Wistron Corporation, New Taipei (TW)

(72) Inventors: Yu-Wei Fan, New Taipei (TW); Shih-Ting Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 684 days.

(21) Appl. No.: 17/701,623

(22) Filed: Mar. 22, 2022

(65) Prior Publication Data
US 2023/0217249 A1    Jul. 6, 2023

(30) Foreign Application Priority Data
Jan. 4, 2022  (TW) .................................. 111100245

(51) Int. Cl.
*H04W 12/08* (2021.01)
*H04W 8/18* (2009.01)
*H04W 12/71* (2021.01)

(52) U.S. Cl.
CPC ........... *H04W 12/08* (2013.01); *H04W 8/183* (2013.01); *H04W 12/71* (2021.01)

(58) Field of Classification Search
CPC ..... H04W 12/08; H04W 8/183; H04W 12/71; H04W 8/205; H04W 12/35
See application file for complete search history.

(56) References Cited

U.S. PATENT DOCUMENTS

| | | | |
|---|---|---|---|
| 2017/0269918 A1 | 9/2017 | Dumoulin | |
| 2020/0137555 A1* | 4/2020 | Dos Santos | H04W 8/18 |
| 2020/0196131 A1 | 6/2020 | Fan | |
| 2022/0046408 A1* | 2/2022 | Kang | H04W 8/183 |

FOREIGN PATENT DOCUMENTS

| | | | | |
|---|---|---|---|---|
| EP | 3606117 A1 * | 2/2020 | | H04W 12/06 |
| WO | WO-2019229188 A1 * | 12/2019 | | |

OTHER PUBLICATIONS

ETSI TS 102 221 V17.1.0 (Feb. 2022) Technical Specification Smart Cards; UICC-Terminal interface; Physical and logical characteristics (Release 17) pp. 50-53 (Year: 2022).*

* cited by examiner

*Primary Examiner* — Brandon J Miller
(74) *Attorney, Agent, or Firm* — Winston Hsu

(57) ABSTRACT

A network service accessing method for a mobile terminal apparatus includes adding an access profile column of an application protocol data unit (APDU) of an embedded universal integrated circuit card (eUICC) of the mobile terminal apparatus; enabling a first profile and a second profile of the eUICC of the mobile terminal apparatus; sending a command of accessing a first issuer security domain profile (ISD-P) of the first profile or a command of accessing a second ISD-P of the second profile; and accessing data of the first ISD-P of the first profile or data of the second ISD-P of the second profile.

12 Claims, 6 Drawing Sheets

| Class | 81 |
| --- | --- |
| Ins | E2 |
| P1 | 91 |
| P2 | 00 |
| P3 | 14 |
| LPA Tag | BF |
| Access_Profile | 45 |
| len | 11 |
| Choice_TL | A0 |
| len | 0C |
| iccid_TLV | 5A |
| len | 0A |
| iccid | 98 68 40 06 91 19 00 01 85 58 |
| refreshF_TLV | 81 |
| Len | 1 |
| refresh | FF |

FIG. 2

| | |
|---|---|
| Class | 81 |
| Ins | E2 |
| P1 | 91 |
| P2 | 00 |
| P3 | 14 |
| P4 | 00 |
| LPA Tag | BF |
| Enable | 31 |
| len | 11 |
| Choice_TL | A0 |
| len | 0C |
| iccid_TLV | 5A |
| len | 0A |
| iccid | 98 68 40 06 91 19 00 01 85 58 |
| refreshF_TLV | 81 |
| Len | 1 |
| refresh | FF |

FIG. 4

ACCESS METHOD FOR NETWORK SERVICE AND RELATED MOBILE TERMINAL APPARATUS

BACKGROUND OF THE INVENTION

1. Field of the Invention

The present invention relates to an access method for network service and a related mobile terminal apparatus, and more particularly, to an access method for network service and a related mobile terminal apparatus capable of achieving Dual SIM Dual Standby (DSDS).

2. Description of the Prior Art

Conventional mobile communications/wireless devices, e.g. smart phones, tablets or laptops, include one or multiple embedded universal integrated circuit cards (eUICC) or subscriber identity module (SIM) cards. The eUICC card and the SIM card may store multiple subscribed user identity information, such that the user may access multiple operators or networks.

Since the conventional eUICC structure may store multiple profiles, the user may switch or manage different profiles stored in the eUICC via user interface (UI) to achieve multiple-connection allocation under the eUICC structure of the mobile device. However, the conventional technique cannot access multiple SIM cards under the eUICC structure, i.e. the Dual SIM Dual Standby (DSDS) allocation.

Therefore, improvements are necessary to the conventional technique.

SUMMARY OF THE INVENTION

In light of this, the present invention provides an access method for network service and a related mobile terminal apparatus to achieve the network service accessing method with Dual SIM Dual Standby (DSDS).

An embodiment of the present invention discloses a network service accessing method for a mobile terminal apparatus comprises adding an access profile column of an application protocol data unit (APDU) of an embedded universal integrated circuit card (eUICC) of the mobile terminal apparatus; enabling a first profile and a second profile of the eUICC of the mobile terminal apparatus; sending a command of accessing a first issuer security domain profile (ISD-P) of the first profile or a command of accessing a second ISD-P of the second profile; and accessing data of the first ISD-P of the first profile or data of the second ISD-P of the second profile.

Another embodiment of the present invention discloses a network service accessing method for a mobile terminal apparatus comprises adding an identity column of an application protocol data unit (APDU) of an embedded universal integrated circuit card (eUICC) of the mobile terminal apparatus; enabling a first profile and a second profile of the eUICC of the mobile terminal apparatus; sending a command of accessing a first issuer security domain profile (ISD-P) of the first profile or a command of accessing a second ISD-P of the second profile; and accessing data of the first ISD-P of the first profile or data of the second ISD-P of the second profile according to the identity column of the APDU of the eUICC.

Another embodiment of the present invention discloses a mobile terminal apparatus comprises an embedded universal integrated circuit card (eUICC); a processing apparatus, coupled to the eUICC; and a memory unit, coupled to the eUICC and the processing apparatus, configured to store a program code instructing the processing apparatus to perform a network service accessing method, wherein the network service accessing method comprises adding an access profile column of an application protocol data unit (APDU) of an embedded universal integrated circuit card (eUICC) of the mobile terminal apparatus; enabling a first profile and a second profile of the eUICC of the mobile terminal apparatus; sending a command of accessing a first issuer security domain profile (ISD-P) of the first profile or a command of accessing a second ISD-P of the second profile; and accessing data of the first ISD-P of the first profile or data of the second ISD-P of the second profile.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram of an application protocol data unit according to an embodiment of the present invention.

FIG. 4 is a schematic diagram of an application protocol data unit according to another embodiment of the present invention.

DETAILED DESCRIPTION

According to specification of Groupe Speciale Mobile Association (GSMA), a conventional embedded universal integrated circuit card (eUICC) structure downloads profile information via a remote SIM provisioning (RSP) and stores the profile information in an issuer security domain profile (ISD-P), wherein the profile includes corresponding application identifier (AID) and integrate circuit card identity (ICCID) value. Under the conventional eUICC structure, a refresh proactive command of the SIM card is triggered to initialize the SIM card after the profile is enabled. However, the corresponding profile or ID of the SIM card slot is not included in the refresh proactive command, and thereby only the enabled profile may be accessed. That is, the conventional eUICC cannot access multiple profiles to achieve Dual SIM Dual Standby (DSDS) application.

Figure 1:
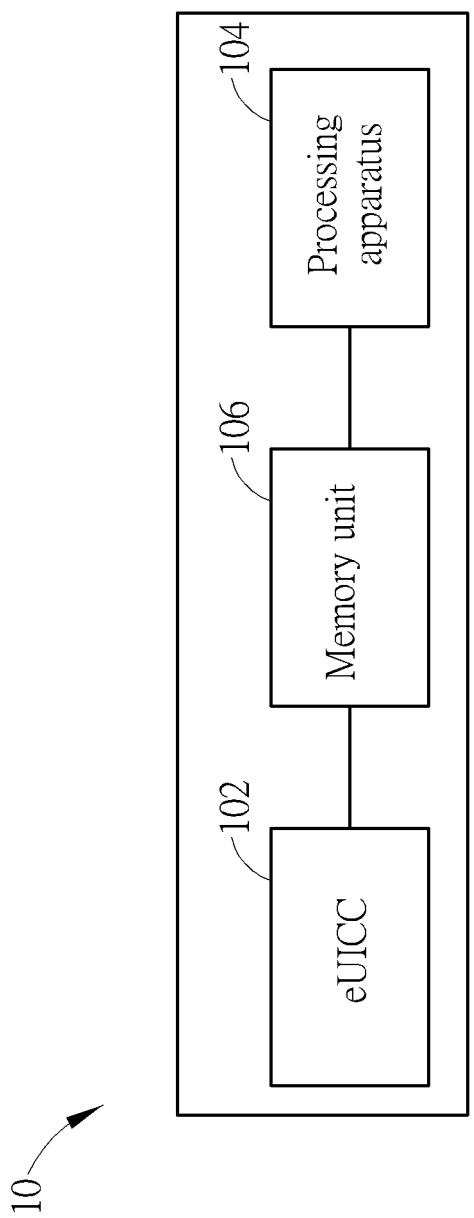
FIG. 1 is a schematic diagram of a mobile terminal apparatus according to an embodiment of the present invention.

Please refer to FIG. 1, which is a schematic diagram of a mobile terminal apparatus 10 according to an embodiment of the present invention. The mobile terminal apparatus 10 may be a user equipment (UE), a mobile station, a mobile terminal, a smart device or a tablet. The mobile terminal apparatus 10 may communicate with a wireless communication system, and the mobile terminal apparatus 10 includes an embedded universal integrated circuit card (eUICC) 102, a processing apparatus 104 and a memory unit 106. The processing apparatus 104 is coupled to the eUICC 102, the memory unit 106 is coupled to the eUICC 102 and the processing apparatus 104, and is configured to store a program code instructing the processing apparatus 104 to perform a network service accessing method to achieve dual SIM dual standby (DSDS) application.

According to the network service accessing method, the mobile terminal apparatus 10 is configured to add an access profile column of an application protocol data unit (APDU) of the eUICC 102, enable a first profile Profile_1 and a second profile Profile_2 of the eUICC 102 of the mobile terminal apparatus 10, wherein the profile includes corresponding document structure, profile and application procedures. Under the structure of eUICC, internal documents and applications can be accessed when enabled via the eUICC (i.e. the network may be accessed by the enabled profile), therefore, after the first profile Profile_1 and the second profile Profile_2 are enabled, the mobile terminal apparatus 10 may access networks via the first profile Profile_1 and the second profile Profile_2. Then, the mobile terminal apparatus 10 sends a command of accessing a first issuer security domain profile (ISD-P) ISD_P1 of the first profile Profile_1 or a command of accessing a second ISD-P of the second profile and accesses the data of the first ISD-P ISD_P1 of the first profile Profile_1 or accesses the data of the second ISD-P ISD_P2 of the second profile Profile_2.

Specifically, please refer to FIG. 2, which is a schematic diagram of the application protocol data unit APDU according to an embodiment of the present invention. The application protocol data unit APDU is a communication unit between a host terminal and the eUICC 102, and the application protocol data unit APDU complies with a standard specification of an abstract syntax notation one (ASN.1) of Groupe Speciale Mobile Association (GSMA). As shown in FIG. 2, CLA of the application protocol data unit APDU indicates a column type, INS indicates a command code, P1 and P2 indicate command parameters, LPA Tag indicates a local profile assistant (LPA) tag, Access_Profile indicates an access profile command, and ICCID value indicates issuer security domain profile.

In this regard, the eUICC 102 of the mobile terminal apparatus 10 according to an embodiment of the present invention may read contents of the ICCID value via the access profile command Access_Profile. In the example of FIG. 2, "45" of Access_Profile denotes whether or not to access the issuer security domain profile and the ICCID value denotes the issuer security domain profile.

Figure 3:
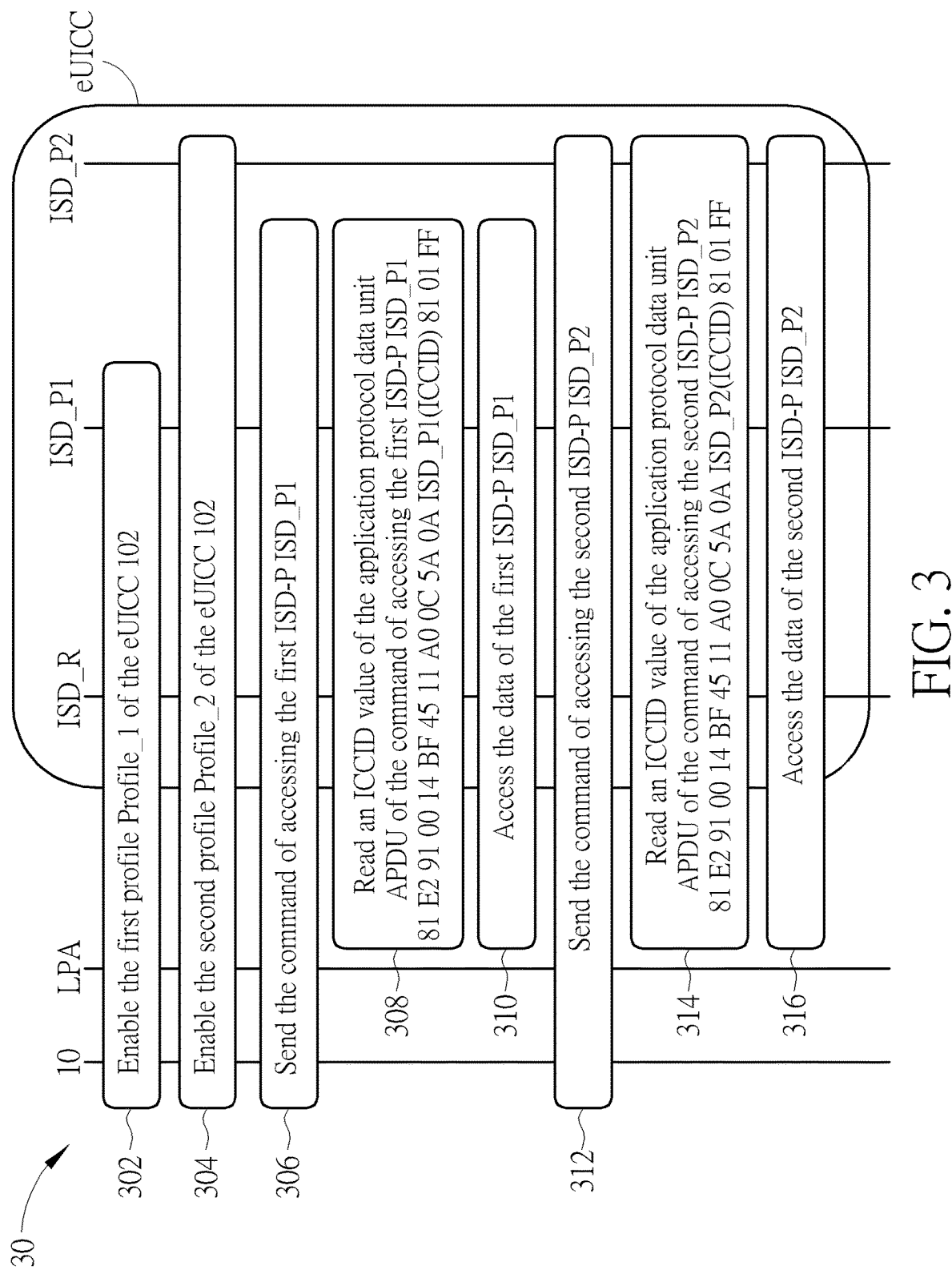
FIG. 3 is a schematic diagram of a network service accessing method according to an embodiment of the present invention.

A network service accessing method 30 for the mobile terminal apparatus 10 may be summarized, as shown in FIG. 3. The network service accessing method 30 includes the following steps:

Step 302: Enable the first profile Profile_1 of the eUICC 102;

Step 304: Enable the second profile Profile_2 of the eUICC 102;

Step 306: Send the command of accessing the first ISD-P ISD_P1;

Step 308: Read an ICCID value of the application protocol data unit APDU of the command of accessing the first ISD-P ISD_P1;

Step 310: Access the data of the first ISD-P ISD_P1;

Step 312: Send the command of accessing the second ISD-P ISD_P2;

Step 314: Read an ICCID value of the application protocol data unit APDU of the command of accessing the second ISD-P ISD_P2;

Step 316: Access the data of the second ISD-P ISD_P2.

Based on the network service accessing method 30, the mobile terminal apparatus 10 enables the first profile Profile_1 and the second profile Profile_2 via the local profile assistant LPA and an issuer security domain root ISD R in steps 302, 304. As such, after the mobile terminal apparatus 10 sends a proactive command (i.e. the command of accessing the first ISD-P ISD_P1) in step 306, the mobile terminal apparatus 10 reads the ICCID value of the application protocol data unit APDU of the command of accessing the first ISD-P ISD_P1 in step 308 and then accesses the corresponding data in step 310. Similarly, after the mobile terminal apparatus 10 sends a proactive command (i.e. the command of accessing the second ISD-P ISD_P2) in step 312 and reads the ICCID value of the application protocol data unit APDU of the command of accessing the second ISD-P ISD_P2 in step 314, the mobile terminal apparatus 10 accesses the corresponding data in step 316.

In other words, according to an embodiment of the present invention, the command of accessing profile Access_Profile is added to the application protocol data unit APDU under conventional structure of eUICC, such that the corresponding data of the ISD-P may be accessed when multiple profiles are enabled after the eUICC 102 receives the corresponding command. In this way, the mobile terminal apparatus 10 according to an embodiment of the present invention achieves DSDS applications with multiple profiles of the eUICC 102.

Notably, compared to the conventional technique, the mobile terminal apparatus 10 according to an embodiment of the present invention does not need to activate a refresh proactive command to initialize the eUICC 102 after the first profile Profile_1 and the second profile Profile_2 of the eUICC 102 are enabled based on the network service accessing method 30.

In another embodiment, a column P4 may be added to the application protocol data unit APDU to distinguish different identities (ID) corresponding to different slots of the eUICC 102. For example, the column P4 "00" indicates the slot with the first profile Profile_1, or the column P4 "01" indicates the slot with the second profile Profile_2.

Refer to FIG. 4, which is a schematic diagram of an application protocol data unit APDU according to another embodiment of the present invention. Different with FIG. 2, the column P4 is added, such that after the eUICC 102 receives the application protocol data unit APDU, the value of the column P4 is read and decoded, such that the mobile terminal apparatus 10 may access the corresponding data of the ISD-P.

Figure 5:
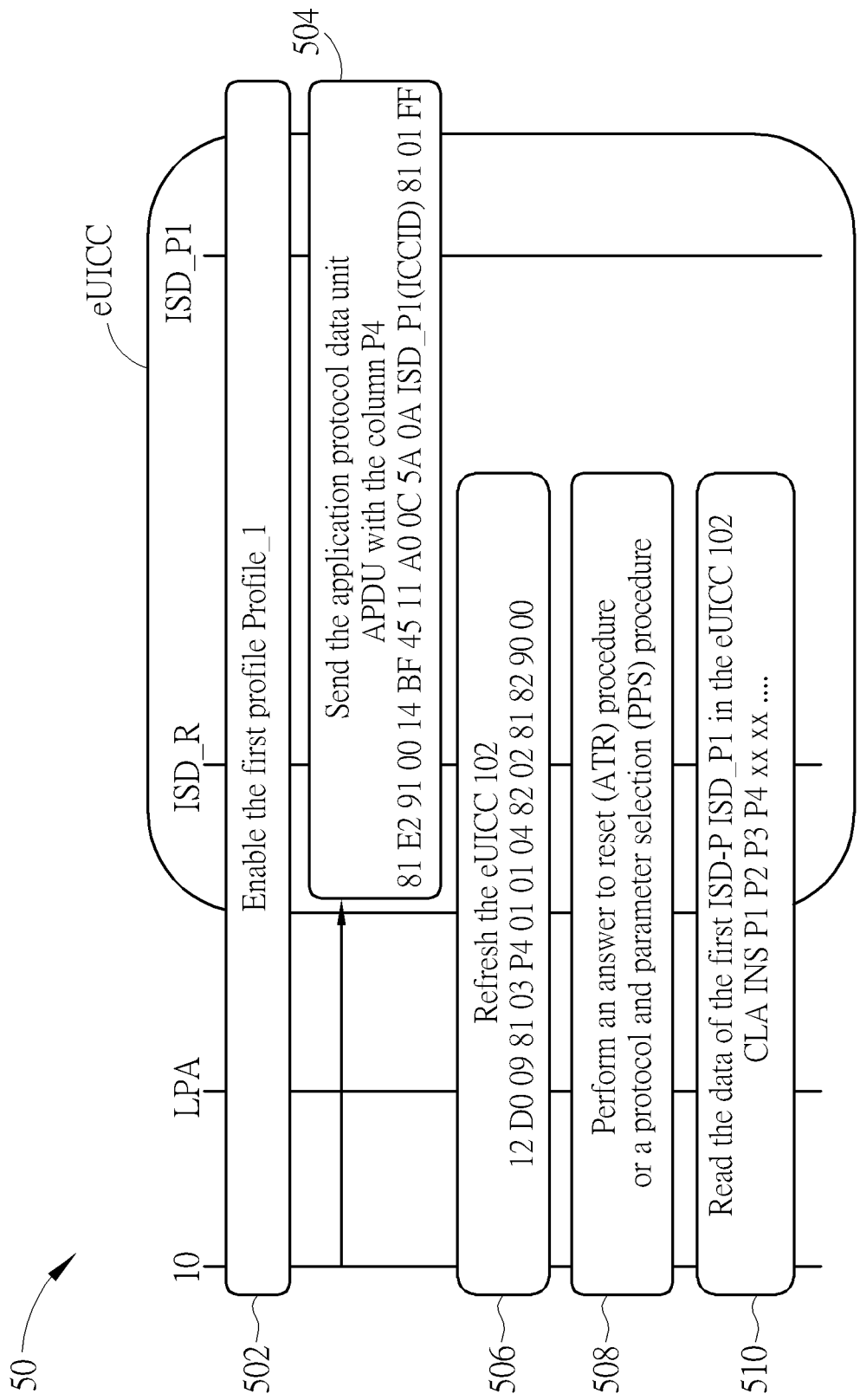
FIG. 5 is a schematic diagram of a profile enabling method according to an embodiment of the present invention.
Figure 6:
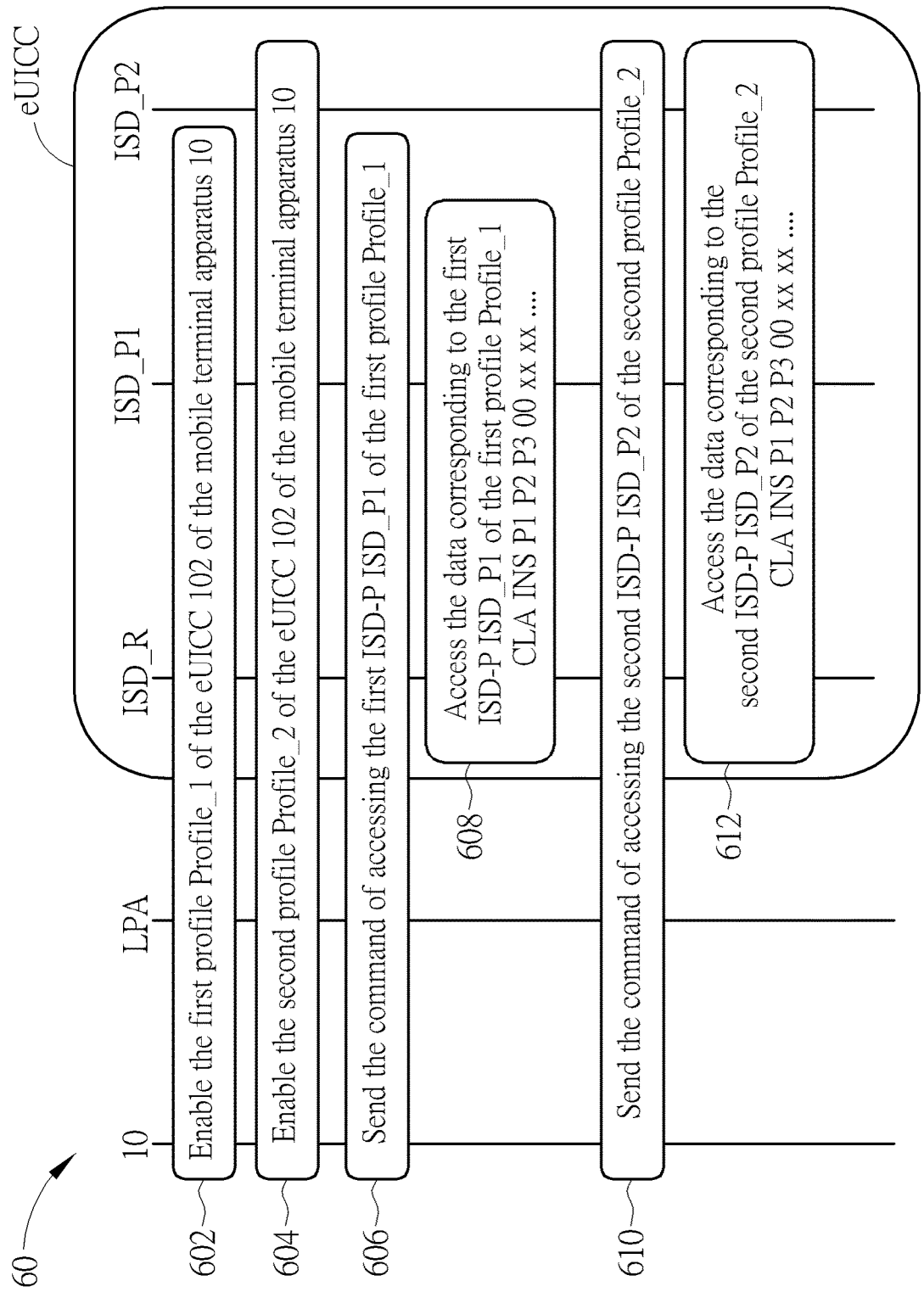
FIG. 6 is a schematic diagram of a network service accessing method according to another embodiment of the present invention.

For example, when the value of the column P4 is 00, a profile enabling method 50 may be summarized according to an enabling operation of the mobile terminal apparatus 10, as shown in FIG. 5. The profile enabling method 50 includes the following steps:

Step 502: Enable the first profile Profile_1;

Step 504: Send the application protocol data unit APDU with the column P4;

Step 506: Refresh the eUICC 102;

Step 508: Perform an answer to reset (ATR) procedure or a protocol and parameter selection (PPS) procedure;

Step 510: Read the data of the first ISD-P ISD_P1 in the eUICC 102.

Based on the profile enabling method 50, after the mobile terminal apparatus 10 enables the first profile Profile_1 in step 502, the mobile terminal apparatus 10 sends the application protocol data unit APDU with the column P4 in step 504, and then reads the value of the column P4, such that the value of the column P4 is decoded to access the corresponding data of the ISD-P. The eUICC 102 is refreshed in step 506, the ATR procedure or the PPS procedure is performed in step 508 and the data of the first ISD-P ISD_P1 is read in step 510. Similarly, the profile enabling method 50 may be modified to enable the second profile Profile_2 when the column value of P4 is "01".

In addition, based on the application protocol data unit APDU in FIG. 4, a network service accessing method 60 of the mobile terminal apparatus 10 may be summarized. The network service accessing method 60 includes the following steps:

Step 602: Enable the first profile Profile_1 of the eUICC 102 of the mobile terminal apparatus 10;

Step 604: Enable the second profile Profile_2 of the eUICC 102 of the mobile terminal apparatus 10;

Step 606: Send the command of accessing the first ISD-P ISD_P1 of the first profile Profile_1;

Step 608: Access the data corresponding to the first ISD-P ISD_P1 of the first profile Profile_1;

Step 610: Send the command of accessing the second ISD-P ISD_P2 of the second profile Profile_2;

Step 612: Access the data corresponding to the second ISD-P ISD_P2 of the second profile Profile_2.

Based on the network service accessing method 60, the mobile terminal apparatus 10 according to an embodiment of the present invention enables the first profile Profile_1 and the second profile Profile_2 via the local profile assistant (LPA) and the issuer security domain root ISD R in steps 602, 604. After the mobile terminal apparatus 10 sends the command of accessing the first ISD-P ISD_P1 of the first profile Profile_1 in step 606, the data corresponding to the first ISD-P ISD_P1 of the first profile Profile_1 may be directly accessed based on the column P4 of the application protocol data unit APDU of the eUICC 102.

Moreover, since the second profile Profile_2 is enabled (i.e. in an active state), after the mobile terminal apparatus 10 sends the command of accessing the second ISD-P ISD_P2 of the second profile Profile_2 in step 610, the data corresponding to the second ISD-P ISD_P2 of the second profile Profile_2 may be directly accessed based on the column P4 of the application protocol data unit APDU of the eUICC 102.

Notably, those skilled in the art may make proper modifications to the mobile terminal apparatus. For example, a number of operator profiles, the local profile assistant or the value of access profile command may be adjusted according to system requirements, and not limited thereto.

In summary, the present invention provides a network service accessing method and a mobile terminal apparatus, which enable multiple profiles of eUICC structure, such that data of the profiles of the mobile terminal apparatus may be simultaneously accessed to achieve Dual SIM Dual Standby (DSDS) application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network service accessing method for a mobile terminal apparatus, comprising:
adding an access profile column of an application protocol data unit (APDU) of an embedded universal integrated circuit card (eUICC) of the mobile terminal apparatus;
enabling a first profile and a second profile of the eUICC of the mobile terminal apparatus;
sending a command of accessing a first issuer security domain profile (ISD-P) of the first profile or a command of accessing a second ISD-P of the second profile; and
accessing data of the first ISD-P of the first profile or data of the second ISD-P of the second profile;
wherein the step of accessing the data of the first ISD-P of the first profile or the data of the second ISD-P of the second profile comprises:
reading the access profile column of the APDU of the eUICC according to the command of accessing the first ISD-P; and
accessing the data of the first ISD-P according to an integrated circuit card identity (ICCID) stored in the access profile column.

2. The network service accessing method of claim 1, wherein the APDU complies with a standard specification of an abstract syntax notation one (ASN.1) of Groupe Speciale Mobile Association (GSMA).

3. The network service accessing method of claim 1, wherein the step of accessing the data of the first ISD-P of the first profile or the data of the second ISD-P of the second profile comprises:
reading the access profile column of the APDU of the eUICC according to the command of accessing the second ISD-P; and
accessing the data of the second ISD-P according to an integrated circuit card identity (ICCID) stored in the access profile column.

4. The network service accessing method of claim 1, wherein the access profile column belongs to a local profile assistant (LPA) tag of the APDU.

5. The network service accessing method of claim 1, wherein a refresh proactive command initiating the eUICC is not activated after the first profile and the second profile of the eUICC of the mobile terminal apparatus are enabled.

6. A network service accessing method for a mobile terminal apparatus, comprising: adding an identity column of an application protocol data unit (APDU) of an embedded universal integrated circuit card (eUICC) of the mobile terminal apparatus; enabling a first profile and a second profile of the eUICC of the mobile terminal apparatus; sending a command of accessing a first issuer security domain profile (ISD-P) of the first profile or a command of accessing a second ISD-P of the second profile; and accessing data of the first ISD-P of the first profile or data of the second ISD-P of the second profile according to the identity column of the APDU of the eUICC; refreshing the eUICC with the first ISD.P according to the identity column of the APDU, after the first profile of the eUICC of the mobile terminal apparatus is enabled; performing an answer to reset (ATR) procedure or a protocol and parameter selection (PPS) procedure; and reading data of the first ISD-P of the eUICC.

7. The network service accessing method of claim 6, wherein the APDU complies with a standard specification of an abstract syntax notation one (ASN.1) of Groupe Speciale Mobile Association (GSMA).

8. A mobile terminal apparatus, comprising:
an embedded universal integrated circuit card (eUICC);
a processing apparatus, coupled to the eUICC; and
a memory unit, coupled to the eUICC and the processing apparatus, configured to store a program code instructing the processing apparatus to perform a network service accessing method, wherein the network service accessing method comprises:

adding an access profile column of an application protocol data unit (APDU) of an embedded universal integrated circuit card (eUICC) of the mobile terminal apparatus;

enabling a first profile and a second profile of the eUICC of the mobile terminal apparatus;

sending a command of accessing a first issuer security domain profile (ISD-P) of the first profile or a command of accessing a second ISD-P of the second profile; and accessing data of the first ISD-P of the first profile or data of the second ISD-P of the second profile;

wherein the step of accessing the data of the first ISD-P of the first profile or the data of the second ISD-P of the second profile comprises:

reading the access profile column of the APDU of the eUICC according to the command of accessing the first ISD-P; and accessing the data of the first ISD-P according to an integrated circuit card identity (ICCID) stored in the access profile column.

9. The mobile terminal apparatus of claim 8, wherein the APDU complies with a standard specification of an abstract syntax notation one (ASN.1) of Groupe Speciale Mobile Association (GSMA).

10. The mobile terminal apparatus of claim 8, wherein the step of accessing the data of the first ISD-P of the first profile or the data of the second ISD-P of the second profile comprises:

reading the access profile column of the APDU of the eUICC according to the command of accessing the second ISD-P; and accessing the data of the second ISD-P according to an integrated circuit card identity (ICCID) stored in the access profile column.

11. The mobile terminal apparatus of claim 8, wherein the access profile column belongs to a local profile assistant (LPA) tag of the APDU.

12. The mobile terminal apparatus of claim 8, wherein a refresh proactive command initiating the eUICC is not activated after the first profile and the second profile of the eUICC of the mobile terminal apparatus are enabled.

* * * * *